INVENTOR.
HANS R. MÜLLER

BY K. P. Johnson
ATTORNEY

Jan. 27, 1970 H. R. MÜLLER 3,491,946

FLUID-ACTUATED SYNCHRONIZING APPARATUS

Filed June 28, 1966 2 Sheets-Sheet 2

United States Patent Office 3,491,946
Patented Jan. 27, 1970

3,491,946
FLUID-ACTUATED SYNCHRONIZING APPARATUS

Hans R. Müller, Endicott, N.Y., assignor to International Business Machines Corporation, Armonk, N.Y., a corporation of New York Filed June 28, 1966, Ser. No. 561,116
Int. Cl. G06m *1/12;* G06d *1/00*
U.S. Cl. 235—201 11 Claims

ABSTRACT OF THE DISCLOSURE

A fluid logic system for synchronizing random input fluid pulses with a series of controlled time pulses.

This invention relates generally to devices operated by fluid pressure, and more particularly to such devices interconnected to provide a synchronizing circuit which can be used to control data transmission.

Portions of the material herein disclosed have been disclosed and claimed in copending applications "Fluid-Operated Logic Devices," Ser. No. 384,921, now Patent No. 3,318,329, filed July 24, 1964, by R. E. Norwood, and "Diaphragm-Type Fluid Logic Latch," Ser. No. 524,166, now Patent No. 3,433,257, filed Feb. 1, 1966, by D. F. Jensen. Both of the above applications are assigned to the assignee of the present application.

In logic systems using pressurized fluid as the energy medium, the transfer of intelligence requires that processed data be synchronized with a time base within the processing apparatus to permit subsequent, meaningful interpretation. Data signals represented as changes in fluid pressure levels, are especially subject to variation in arrival time during transmission through ducts and during the operation of asynchronous signal generating devices. When the transmitted or generated signals are applied to data handling apparatus, which may store, transmit or operate on the data, the incoming signals generally are combined with timing signals produced in the receiving apparatus. The combination of input and timing signals then permits the required interpretation and processing.

In order to accurately handle the input data, the input signals must, of course, occur at a repetition rate slower than the timing signals. Although the input rate may be sufficiently slow, the input data must be organized to occur or not at regular intervals within the receiving apparatus to permit encoding, decoding and storage. An input signal arriving out of coincidence with a timing signal must be preserved and applied to the receiving apparatus with the following timing signal; otherwise, it is possible that input signals would be lost through nonacceptance. During the combination of input and timing signals, provision must also be made to avoid the possibility of accepting the input signal with one timing signal and also delaying the same input signal, for combination with the succeeding timing signal. This is necessary to prevent the recognition of two output data signals when in actuality there was but a single input data signal.

Accordingly, it is a primary object of this invention to provide fluid-actuated apparatus for synchronizing random input pressure signals with regularly recurring timing signals and thereby produce accurately timed output data signals.

Another object of this invention is to provide fluid-actuated synchronizing apparatus capable of temporarily storing noncoincident input data signals until the occurrence of a subsequent timing signal.

Still another object of this invention is to provide fluid-actuated synchronizing apparatus capable of determining the degree of coincidence between input data and timing signals and storing any input signals not having the requisite degree of coincidence with the timing signals.

A still further object of this invention is to provide fluid-actuated synchronizing apparatus having a first signal propagation path for input data signals having a predetermined degree of coincidence with timing signals, and a second propagation path for input signals not having such coincidence.

The foregoing objects are attained with the present invention by arranging fluid-actuated means to provide two signal propagation paths having a common origin for accepting input data signals and, interconnecting with the paths, means for determining from the degree of coincidence with timing signals which path each data signal is to follow. A means is in the path taken by the noncoincident signal for delaying the signal sufficiently to coincide with a succeeding timing signal. Further means provides a temporary store for either the coincident or noncoincident signals until an output signal is produced coincident with one of the timing signals. Because of the delay in data signal propagation, means is provided to produce a corresponding delay in each timing signal for coincidence in producing an output signal.

The invention also provides fluid-actuated single shot devices which produce pressure signals having uniform duration from varying input data signals, and produce signals of increased duration from the output data signals. The invention uses as an example of a decision element, a hysteresis latch which is not subject to oscillation in the event that the coincidence between an input data signal and timing signal is marginal.

The foregoing and other objects, features and advantages of the invention will be apparent from the following more particular description of preferred embodiments of the invention, as illustrated in the accompanying drawings wherein.

Figure 3A:
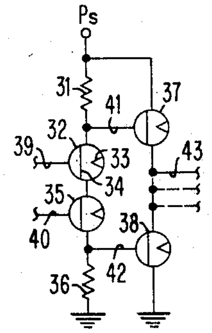
Figure 3B:
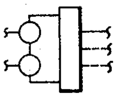
Figure 4A:
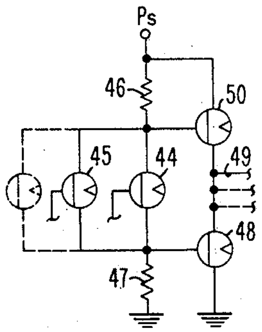
Figure 4B:
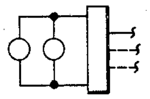
Figure 5:
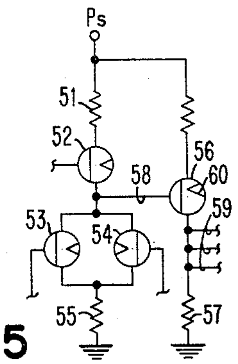
Figure 6:
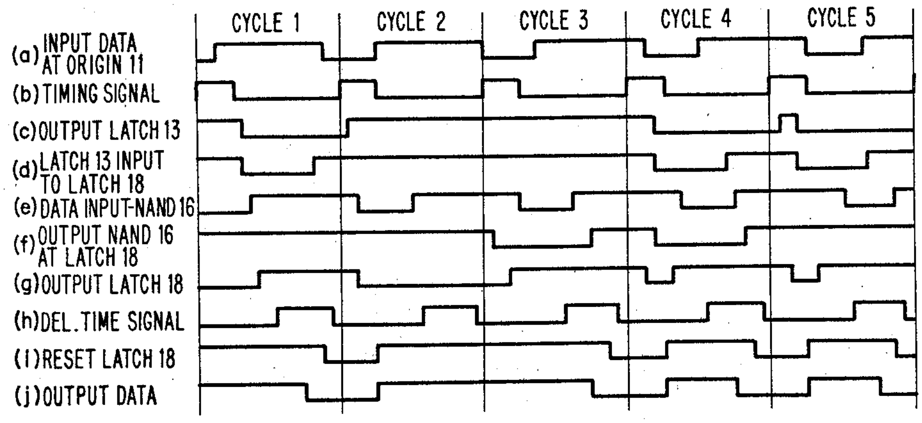
Figure 2:
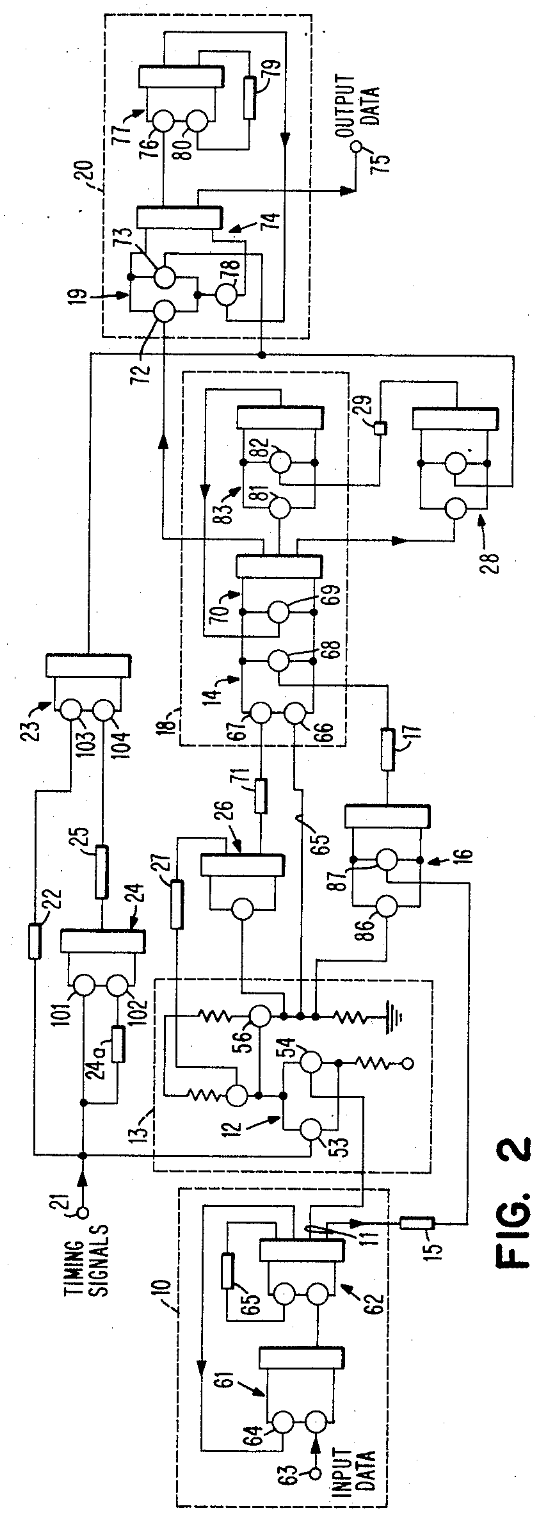
FIGURE 2 is a schematic diagram of the detailed arrangement of fluid-controlled logical devices with which the synchronizing function of the invention is accomplished.

FIGURES 3*a* and 3*b* are detailed diagrams of the logical NOR device used in the synchronizing circuit;

FIGURES 4*a* and 4*b* are detailed diagrams of the logical NAND device used in the synchronizing circuit;

FIGURE 5 is a detailed diagram of a latch used in the synchronizer circuit;

FIGURE 6 is a timing diagram of the fluid-actuated circuit shown in FIG. 2; and

Figure 7:
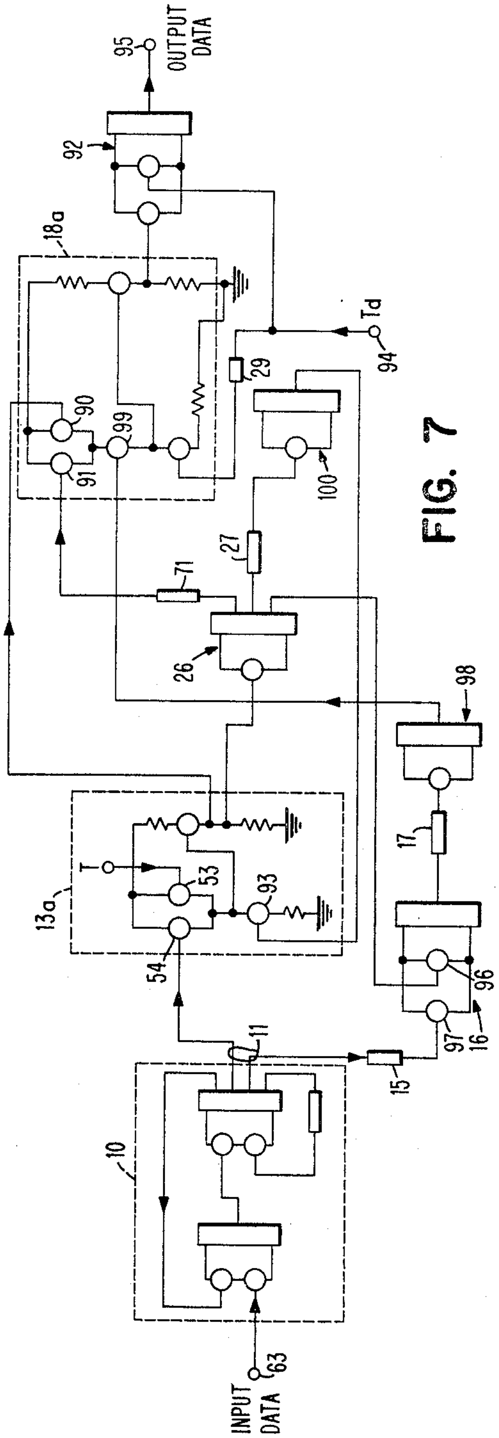

FIGURE 7 is a schematic diagram of an alternative embodiment of the invention.

Figure 1:
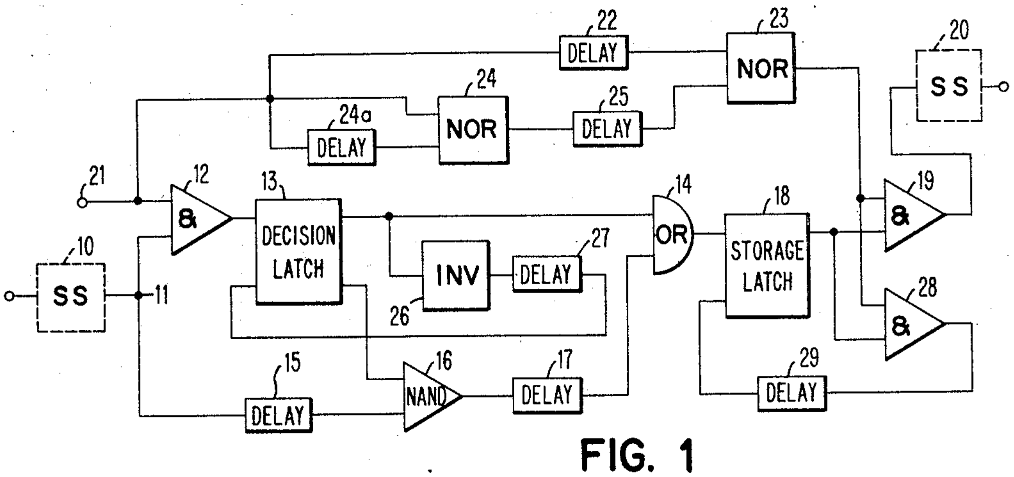
FIGURE 1 is a schematic logic diagram of the synchronizing apparatus of the present invention.

Referring to FIG. 1, there is shown the logical equivalent of the synchronizer apparatus of the invention. Incoming random data signals, represented by changes in fluid pressure, are applied at the input terminal of optional Single Shot device 10 which produces, for each signal applied, a signal of predetermined duration and amplitude which is supplied to two signal duct paths diverging from a common origin 11. One input data path comprises the fluid-actuated devices of AND 12, Decision Element 13 and OR 14. The other path includes the devices of Delay 15, NAND 16, Delay 17 and OR 14. OR 14 supplies data signals from either path to temporary Storage Latch 18 and output signals are produced through AND 19 and optional output Single Shot 20. In this apparatus, Decision Element 13 is selected as a latch as described in FIG. 5.

Timing signals, represented by changes in fluid pressure, are applied at terminal 21 and are also provided with two duct paths of common origin, one being to AND 12, and the other being through Delay 22 and NOR 23 for application to output AND 19. A branch path includes Inverter 24 and Delay 25 that further define the timing signal delay which is ultimately applied at AND 19.

An input data signal is applied from Single Shot 10 at origin 11 and appears at AND 12 where it is coarsely tested for coincidence with timing signals applied at terminal 21. Decision Latch 13 requires a signal of some predetermined minimum duration in order to switch. Therefore, the signal from AND 12 may or may not be of sufficient duration although there was originally a degree of coincidence between a data and timing signal. If Latch 13 is set, then a signal is produced directly at OR device 14 which sets Storage Latch 18 on to indicate the presence of a data signal therein.

In the event that Decision Latch 13 is not switched on by the signal from AND 12, provision is made to preserve the data input signal. This is done by also propagating the input signal along the second path through Delay 15 which holds up signal propagation sufficiently to permit decision Latch 13 to switch if there was an adequate signal. If the Decision Latch was set, there would be no signal at the off output to NAND 16 so that the input data signal from Delay 15 would be blocked. If, on the other hand, the Decision Latch did not switch on, NAND 16 would be conditioned an dthe coincidence with the data signal from Delay 15 causes NAND 16 to produce an input signal to additional Delay 17. Delay 17 provides additional delay sufficient to insure that the input data signal thus represented will coincide with a subsequent timing cycle in the synchronizing apparatus. After leaving Delay 17, the data signal passes through OR 14 to set Storage Latch 18 and indicate the presence of a stored data signal.

Storage Latch 18 can be set on either by an input data signal coincident with a timing signal or by an input signal not coincident with a timing signal. The synchronizer apparatus is constructed to distinguish the coincident and noncoincident signals by again combining the output of Storage Latch 18 with timing signals at AND 19. These timing signals are those which were applied at terminal 21 but which have been delayed an amount equivalent to the propagation time required of an input data signal through AND 12, Decision Latch 13, OR 14 and Storage Latch 18. Timing signal delay is produced by Delay 22 and NOR 23, being approximately equal to one-half the timing signal cycle time at 120 cycles per second.

When a data signal is propagated via Latch 13, the Storage Latch output equivalent thereto is coincident with the delayed counterpart of the same timing signal with which the input data signal was originally coincident at AND 12. However, when Storage Latch 18 produces an output signal after being set by an input data signal arriving via Delay 15, the output signal will coincide only with the delayed counterpart of the timing signal occurring at terminal 21 after the original data signal was applied at origin 11. Storage Latch 18 may thus be set on for varying lengths of time, dependent upon the coincidence of the input data signals with a timing signal. When AND 19 produces an output, it can be applied to some utilization device or to an optional Single Shot 20 that tailors the output signal to desired duration. The synchronizer apparatus thus distinguishes between coincident and noncoincident data signals and provides equivalent output signals at specific times in a timing signal cycle. Input data signals applied to Single Shot 10 can be regularly or randomly generated but must, of course, be produced at a frequency lower than the timing signal frequency, or else data signals will be lost.

Logic devices of Inverter 24, Delay **24*a*, and Delay 25 are used to control the termination of the delayed timing signal. Inverter 26 and Delay 27 provide a timed reset for Decision Latch 13 while AND 28 and Delay 29 provide a timed reset for Storage Latch 18**.

The fluid-actuated synchronizing apparatus of the invention is shown in FIG. 2, and is constructed with diaphragm-controlled logic devices to provide the required logic functions. However, in order to simplify the drawings, the diaphragm devices are shown in schematic form and the detailed structure of these schematic forms is illustrated in FIGS. 3*a*, 3*b*, 4*a*, 4*b* and 5.

The device shown in FIGS. 3*a* and 3*b* performs a logical NOR function. Pressurized fluid from supply P*s* flows via a duct through fluid resistance 31 which is a flow limiting orifice in the duct, through a diaphragm chamber 32 between fixed ridge 33 and flexible diaphragm 34, through a second similar diaphragm chamber 35, and finally through a second fluid resistance 36 to atmosphere indicated by the symbol used to represent ground potential. A parallel path for pressurized fluid P*s* via a duct to diaphragm chamber 37, similar to chamber 32, and another duct to diaphragm chamber 38 and thence to atmosphere. The second path uses no fluid resistances. Diaphragm chambers 32 and 35 are each connected to respective control ducts 39 and 40 by which control signals of pressurized fluid can be applied to push flexible diaphragm 34 against ridge 33 to block fluid flow through the chamber. Pressure signals are taken from the first path of devices 32 and 35 through ducts 41 and 42 to control the operation of devices 37 and 38. The latter provide amplification and good drive capability for one or more output ducts 43. The resistors 31, 36 and the area ratios of devices 32 and 34 are selected so that the diaphragm devices snap closed at the desired predetermined control pressure level.

Assuming low pressure in both ducts 39 and 40, the diaphragm devices 32 and 35 are open for flow. Resistances 31 and 36 are of a size to maintain the fluid pressure therebetween at approximately 60% of the supply pressure. The pressure then is sufficient in duct 42 to close the diaphragm in device 38, but insufficient to close device 37, causing the pressure in output duct 43 to rise to the supply pressure. If a control signal is applied to either of ducts 39 or 40 then the pressure in duct 41 closes the diaphragm in device 37 and the pressure in duct 42 bleeds to atmosphere so that the diaphragm in device 38 opens and the pressure in output duct 43 also falls to atmospheric pressure. Thus a low pressure present in both ducts 39 and 40 produces a high pressure output level in duct 43. Alternatively, a high pressure in either or both ducts 39 and 40 produces a low pressure signal in duct 43. In other words, the output pressure at duct 43 is the inverse of the input control pressures.

The schematic representation of the NOR just described is shown in FIG. 3*b*. Input diaphragm devices are shown as circles and the NOR may have one or more control diaphragm devices similar to 32 and one or more output ducts 43 may be present as indicated by dotted lines. It will be noted that if the first fluid path contains but a single diaphragm device 32, the arrangement then performs the function of an inverter since the inverse of any pressure level applied at control duct 39 will appear at output duct 43.

The logical NAND function is obtained with the device shown in FIG. 4*a*. This device is similar to the NOR device just described except for the arrangement of two control diaphragm devices 44 and 45 in parallel between the two fluid resistances 46 and 47. When no control signals are present at devices 44 and 45, then device 48 is closed so that a high pressure signal appears at one or more output ducts 49. Because of the parallel arrangement, both devices 44 and 45 must have high pressure control signals applied thereto and be blocked before device 50 will close and produce a low pressure output signal at duct 49. This arrangement thus requires the presence of two coincident control signals before a change in pressure will occur at the output duct. It will be noted that the resulting output from duct 49 is the inversion of the two control signals and that there may be additional diaphragm devices in parallel with device 44 and 45. Both the NOR and NAND arrangements of the diaphrgm devices are disclosed in more detail in the aforementioned Norwood application, Ser. No. 384,921.

In FIG. 5, a latch arrangement of diaphragm devices is shown which provides the function of Decision Latch 13 of FIG. 1. The first latch path comprises a duct from supply P*s*, resistance 51, diaphragm device 52, parallel devices 53 and 54 in series with device 52, and resistance 55. The second path comprises a duct from supply P*s* to single diaphragm device 56 and resistance 57. Duct 58 connects the first path to device 56 and output pressure levels are produced in duct 59. Diaphragm device 56 differs from the other devices in that the ridge 60 is located upstream a predetermined distance from the center of the diaphragm.

Assuming a control signal is present closing device 52 leaving devices 53 and 54 open, atmospheric pressure exists in duct 58 so that device 56 is open and a high pressure level exists in output ducts 59. If the control input to device 52 is now removed, no change occurs in device 56 because the pressure on the ridge side of the diaphragm is essentially at the supply pressure and the pressure on the opposite side of the diaphragm is approximately 60% of the supply pressure. Furthermore, if either device 53 or device 54 is closed still no change will occur in device 56. When both devices 53 and 54 are closed while device 52 is open, the pressure in duct 58 will assume that of the supply closing the diaphragm against ridge 60 because of the slightly lower pressure on the ridge side of the diaphragm due to the continued pressure drop across resistance 57. At this time the output pressure level in ducts 59 will descend to atmospheric. Once device 56 is closed, the control signals on either or both of devices 53, 54 may be removed and device 56 will remain closed. This is due to the fact that pressure in duct 58 will return to approximately 60% of the supply pressure and act on the entire area of one side of the diaphragm in device 56 while the supply pressure acts only on a minor portion of the area on the opposite side of the diaphragm upstream from ridge 60. In this condition, a low pressure signal exists in ducts 59 until device 52 is closed so that the pressure in duct 58 becomes atmospheric and the supply pressure acting on the minor area of the diaphragm device 56 is able to move the diaphragm away from ridge 60. At that time, the output presure level in ducts 59 will rise to the upper level. This latch arrangement is described in more detail in the aforementioned Jensen application, Ser. No. 524,166.

Referring to FIG. 2, reference numerals used to denote the various logic blocks in the description of FIG. 1 have also been used in this figure to identify the fluid-actuated apparatus performing the same logical functions. Random data signals are applied to Single Shot 10 to produce uniform input data signals to the synchronizer apparatus. The Single Shot is composed of two NOR blocks 61, 62 acting as a latch that automatically resets itself at a predetermined time. When a random input signal at a high pressure level appears at input data terminal 63, an inversion occurs and NOR 61 provides a low pressure input level at NOR 62. The latter provides high level outputs in two ducts comprising origin 11, a feedback duct to device 64 to hold the output of NOR 61 low, and through delay volume 65 to automatically terminate the single shot output. When Delay 65 ultimately fills to high level pressure, then the effect of the low signal from NOR 61 is overridden so that NOR 62 produces a low level output. Each change in pressure level in the logic devices described requires time for the transition and varies with the direction of level shift. For example, the shift from a low pressure level to one of high pressure requires approximately 1 millisecond (ms.), while the reverse shift requires approximately 1.5 ms.

Successive data signals appearing at origin 11 of the two data paths are illustrated in FIG. 6*a* as the upper levels therein. Each signal is transmitted both to AND 12 and to volume Delay 15. The test for coincidence with the timing signal is made at AND 12. The timing signals of a fixed frequency are continuously applied at terminal 21 and therefore appear as one input to AND 12. It will be recalled that the operation of Decision Latch 13 has already been described during the consideration of FIG. 4. In the construction of the Decision Latch it is practical to incorporate the AND function directly in the Latch. When a high level timing signal of FIG. 6*b* coincides with the data signal, also of high level at AND 12, then Decision Latch 13 produces an output signal of low level, illustrated in FIG. 6*c*, which is supplied on three different output lines. The latch output in one duct is applied directly to the OR 14 input of Storage Latch 18 opening diaphragm device 66 (FIG. 2) to set Latch 18. The low level output of Latch 13 is applied by a second duct to Inverter 26 causing the inverted output to reset the Latch 13. A third duct applies the low level signal from Latch 13 to NAND 16. It will be recalled that Latch 13 will continue to produce a low level signal even though the signals at devices 53 and 53 are terminated. Therefore Inverter 26 is provided to limit the set signal at OR 14 and to reset the Latch 13. The low level input to Inverter 26 is transformed into a high level signal that is applied to Delay 27 to turn Latch 13 off so that it produces a high output. The delay in turning Latch 13 off is determined by the length of blocking signal required at NAND 16. The signal length applied at device 67 at OR 14 must be shorter than that at NAND 16 and is accomplished by making Delay 71 shorter than Delay 27. The signal from Delay 71 is effective at device 67 to override the low level signal at device 66 after a predetermined time. The difference in signal length at NAND 70 and at NAND 16 is illustrated by comparing the low level signal lengths in FIGS. 6*c* and 6*d*.

Assuming that devices 68 and 69 of NAND 70 are closed, then at the time a low level signal occurs at Latch 13 the signal level from Delay 71 is still low. The two low levels open devices 66 and 67 causing NAND 70 to change its quiescent output to a high level thereby indicating the storage of a data signal therein. The output level from NAND 70 is supplied to three ducts. One duct directs the high level output to diaphragm device 72 to be combined with a delayed timing signal at device 73 of AND 19 thereby producing an output data signal at terminal 75 for a utilization device. AND 19 may be constructed within optional Single Shot 20 so that when the delayed timing signal from NAND 23 and output data signal coincide, NOR 74 produces a low level output that appears at output terminal 75 and also opens device 76 or NOR 77. NOR 77 then changes to a high level output that is fed back to device 78 to lock NOR 74 in the low level condition until Delay 79, also fed from the high level output of NOR 76, provides a high level signal to close device 80 and terminate the single shot signal.

The second duct supplied by NAND 70 leads to diaphragm device 81 which closes when an output data signal of high level is produced from NAND 70. Assuming that device 82 is already closed, then NAND 83 provides a low level feedback input to device 69, causing NAND 70 to latch in the present state and continue its high level signal. Because of the uncertain time of original setting by input signals, Storage Latch 18 does not have an automatic reset. The latch output must continue until a delayed timing signal permits the output data signal to be used.

The reset of Storage Latch 18 is done by NAND 28 in which the high level output in the third duct from NOR 70 is combined with the high level of the delayed timing signal from NOR 23. Upon coincidence, NAND 28, as indicated by the high levels of FIGS. 6*g* and 6*h*, produces a low level pressure that is retarded by Delay 29 and subsequently opens device 82 at NAND 83. This changes the latter's output to high level which is fed back to close device 69. At this time devices 66, 67 and 68 are also closed and NAND 70 produces a low level which is reflected along the ducts to devices 72 and 81 and an input to NAND 28.

The foregoing description of FIGS. 2 and 6 has shown the propagation of an input data signal from origin 11 to Storage Latch 18 and the resulting generation of an output data signal at terminal 75 when input data and timing pulses coincided sufficiently to set Latch 13. The condition now described is that when the input data signal does not coincide with a timing signal or coincides for a time insufficient to set Latch 13. It will be recalled that each input data signal is also applied to Delay 15 for propagation along the alternative path. The delay provides sufficient time for Latch 13 to change its quiescent output to a low level signal if there was sufficient coincidence. When the latch does not change, its output level remains high maintaining diaphragm device 86 of NAND 16 closed. When the high level data signal from Delay 15 reaches device 87, the coincidence then causes NAND 16 to switch to a low level pressure that is applied to Delay 17. Delay 17 insures that the data signal is not applied to device 68 while the Storage Latch 18 is being reset from the previous data signal. After passing Delay 17, the low level signal opens device 68 at OR 14 of NAND 70 producing a high level pressure from the NAND which sets Latch 18. An output data signal is then produced in coincidence with the next delayed timing signal at AND 19 in Single Shot 20 as has already been described above. The resetting of Latch 18 also occurs by the coincidence of a delayed timing signal and output data signal at NAND 28, described above.

The generation of an output data signal occurs in coincidence with a delayed timing signal to more accurately time the generation of the output data. Output timing is critical in serial data transfer because the presence of a high or low signal level at specific times usually indicates a binary value of "0" or "1" to a utilization device. The timing signals applied at terminal 21 cannot also be simultaneously applied at AND 19 and NAND 28 because of the propagation time required for the data signal from origin 11 to the output terminal. Therefore the timing signal is delayed.

The high level timing signal blocks device 101 of NOR 24 causing a signal change to low pressure to be applied to Delay 25. The high level timing signal also passes through Delay 24*a* and closes device 102. Delay 24*a* merely extends the time that NOR 24 is producing a low level output and Delay 25 retards the time of effectiveness. In the meantime the high level timing signal is also applied through Delay 22 to block device 103 of NOR 23. Normally NOR 24 produces a low level output in the absence of a timing signal because device 104 is blocked by the output from NOR 24. Thus the signal from Delay 22 is timed to block device 103 before device 104 is opened by the delayed low level signal from Delay 25. After the high level from Delay 22 terminates then NOR 23 changes to provide a high level output for the duration of the low level from Delay 25. The resulting high level output from NOR 23 can thus be extended in duration beyond the length of the original timing signal and can also be delayed as required.

The adaptability of the synchronizer apparatus of FIG. 2 to marginal timing conditions can be seen by considering the various timing situations illustrated in FIG. 6. In the following description, a data signal period is assumed to be 9 ms. and the timing signal period is 8 ms. Signal times are only appropriate. Taking each timing signal at FIG. 6*b* as an internal cycle merely for purposes of illustration, the 6 ms. high level input data signal of Cycle 1 overlaps the 2 ms. high level timing signal sufficiently at AND 12 to set Decision Latch 13 and produce a low level output in FIG. 6*c*. The latch set time requires 1.5 ms. to produce the change. The latch output is applied directly to OR 14 and is cut short by the inverted output from NAND 26 and Delay 71 to 4 ms. duration at FIG. 6*d*. Latch 13 continues a low level output to NAND 16 for 2 ms. longer at FIG. 6*c*. The high level input data applied through Delay 15 reaches NAND 16 about 2 ms. after generation and after NAND 16 has already been blocked by the low level of Latch 13. The latch signal must last sufficiently long (FIGS. 6*c* and 6*e*) so that the delayed data signal is not applied long enough alone to change the normal high level from NAND 16 at FIG. 6*f*. A signal of 0.5 ms. is usually not effective to change the output of a logic element. In FIG. 6*g* Storage Latch 18 is set 1 ms. after the input of Latch 13 at OR 14. A secondary time signal, delayed 3 ms. at FIG. 6*h*, fully conditions AND 19 so that a low level data output signal appears 1.5 ms. later at terminal 75. Reset NAND 28 is also activated by delayed timing signal but is not effective to reset Latch 18 to the low level pressure until 3 ms. after receipt of the retarded timing signal because of the cumulative affect of Delay 29 of 0.5 ms., the change in NAND 83 of 1 ms., and the change in NAND 70 of 1.5 ms. The timing relationship is shown in FIGS. 6*g*–6*j*.

Looking now at Cycle 2, it will be noted from FIGS. 6*a*–6*c*, and 6*f* that the high levels of the timing and data input signals do not coincide and that Latch 13 does not change to a low level output. However, the delayed data signal, shown in FIG. 6*e*, produces an output signal at NAND 16 and sets Storage Latch 18 about 5.5 ms. later during Cycle 3 time. The delay in setting the latch is that time accumulated because of the requirement of 1.5 ms. for switching NAND 16, 3 ms. in Delay 17 and 1 ms. in switching NAND 70. The total delay causes the latch output to miss the delayed time signal at FIG. 6*h* for Cycle 2, and therefore remain set until the following signal. Thus no reset or output data signal occurs in Cycle 2. Latch 18 remains set to store the data signal for the next cycle.

Referring to Cycle 3 of FIG. 6, the high level data and timing signals again did not coincide so that no signal presence is indicated in Latch 13 at FIGS. 6*c* and 6*d*. The high signal level appears at NAND 16 about 2 ms. later and initiates a low level signal from the NAND that will be effective to set Storage Latch 18 5.5 ms. thereafter. However, Latch 18 is already set by the data signal of Cycle 2 which is cleared during the 5.5 ms. delay. Since Latch 18 is set, the delayed timing signal for Cycle 3 produces an output signal at Single Shot 20 1.5 ms. after the start of the delayed time signal in FIG. 6*j*. The latch reset signal appears at Latch 18 about 2 ms. after the start of the delayed time signal and resets the latch 2.5 ms. thereafter or 4.5 ms. after the start of the delayed time signal. Latch 18 is thus reset 1.0 ms. before it is set again by the NAND 16 data signal for Cycle 3. Reset is not critical because another data signal is immediately present.

In Cycle 4 of FIGS. 6*a*–6*d*, it will be noted that the data signal from Cycle 3 and a timing signal from Cycle 4 coincide to thus set Latch 13 and produce an output low level to Latch 18. The latter is already being set by the low level signal from NAND 16 for Cycle 3. This coincidence causes no problem but merely opens both diaphragm devices 66 and 68 of the latch simultaneously and insures the setting thereof. No data signal is lost or extra data signal generated because only the third input data signal at FIG. 6*a* produced the coincidental inputs to Latch 18.

It will be noted in Cycle 4 that Latch 13 produces a low output because of the overlap of a timing signal with the third input data signal. Latch 13 is still set when the fourth input data signal is applied to NAND 16. Thus, although the fourth data signal misses the fourth timing signal, NAND 16 is blocked. No error occurs because the fourth data signal occurs also coincidentally with the fifth timing signal and will be transmitted therewith.

In the exemplary cycles described, the input data signals were taken at the worst conditions. The overlap of data and timing signals for 1 ms. may or may not be sufficient to set Latch 13. The alternate path is available, however, to pass on the data in case Latch 13 did not set. In practice the data signals must occur at a frequency rate less than the timing signal frequency.

FIG. 7 illustrates a modification of the synchronizer apparatus of the invention in which a variation of Latch 13, shown in FIG. 2, is used also as a Storage Latch 18 of FIG. 2. Elements common in FIGS. 2 and 7 are identified with the same reference numerals. High level data input signals applied at Single Shot 10 are supplied to origin 11 of the two signal paths. If a high level signal at diaphragm device 54 coincides with a high level timing signal T at device 53 then Latch 13*a* is set. In the arrangement shown, Latch 13*a* produces a high level output when both devices 53 and 54 are closed. The output is supplied along two ducts. One duct directs the signal to diaphragm device 90 of Storage Latch 18*a*. In the absence of any input signal to Inverter 26, diaphragm device 91 is also closed by a high level pressure so that Latch 18*a* turns on, producing a high level output to NAND 92. The second duct from Latch 13*a* directs the high level pressure to Inverter 26 which produces a low level pressure that is applied to Delay 71. The delayed output subsequently opens device 91 but the output signal of Latch 18*a* does not change until reset later by a delayed timing signal from Delay 29.

The low level pressure from Inverter 26, resulting from setting Latch 13*a*, is applied through Delay 27 to Inverter 100. Inverter 100 produces a high level pressure that is fed back to block device 93 and reset Latch 13*a*. Although the latch could provide its own reset signal directly through a delay, the rapid action of the latch is lost because of the time required to build up the pressure in the delay volume. Latch 13*a* produces a low level pressure after being reset and opens device 90 in Latch 18*a*. Inverter 26 then returns to a high level, blocking device 91 and causing Inverter 100 to return to a low level.

When Latch 18*a* produces a high level output, after being turned on, the signal is applied to block one input of NAND 92. The other input to NAND 92 is blocked by the occurrence of a high level delayed timing signal T*d* applied at terminal 94. The coincidence of Latch 18*a* being set and a delayed timing signal produces a low level data output signal at terminal 95. The delayed timing signal T*d* is also applied to Delay 29 where it is further delayed before resetting Latch 18*a*. This permits the output signal from NAND 92 to be prolonged beyond the duration of the delayed timing signal. Timing signal T*d* occurs each internal cycle but is effective at NAND 92 only if Latch 18*a* has been set, and resets the latch only if set.

Returning now to origin 11, the high level input data signal from Single Shot 10 is also applied to Delay 15. If Latch 13*a* is not set, then its output is low and the output of Inverter 26 is high so that device 96 of NAND 16 is blocked. When the high level signal from Delay 15 arrives, device 97 is also blocked and NAND 16 produces a low level output that is applied through Delay 17 to Inverter 98. The latter produces a high level signal to close device 99 and set Latch 18*a*. The delays in the second data path cause Latch 18*a* to be set after the delayed counterpart of the timing signal which occurred immediately prior to the data signal. Thus the latch is set until the delayed counterpart of the next timing signal occurs.

In the fluid pressure circuits described, signal delay was indicated by a volume. It will be noted that the desired delay can also be obtained by merely increasing the duct length or providing appropriate duct resistance. These delays do not affect the output pressure curves of the logic devices because the control stages in the logic blocks switch with a snap action when the pressure reaches a predetermined level.

While the invention has been particularly shown and described with reference to preferred embodiments thereof, it will be understood by those skilled in the art that various changes in form and details may be made therein without departing from the spirit and scope of the invention.

What is claimed is:

1. Fluid-operated apparatus for synchronizing random input data signals with timing signals of a prescribed frequency comprising:
- first and second paths having a common input and along which said input signals are propagated;
- storage means settable by each said input signal to temporarily store said input signal;
- means operable during each timing signal interval for applying each said input signal to said storage means over said first path in response to coincidence and over said second path in response to noncoincidence between each said input signal and a timing signal; and
- means controlled by each of said timing signals for producing an output signal representative of a stored data signal during said timing signal period or during a succeeding timing signal period depending on the path used for propagating each said data signal.

2. Apparatus as described in claim 1 wherein said applying means includes means interconnecting said first and second paths and operable to block said second path when a signal is propagated along said first path.

3. Apparatus as described in claim 2 wherein said second path includes means for delaying a signal therein for a predetermined time.

4. Apparatus as described in claim 1 further including signal transforming means responsive to the leading edge of said data signals for supplying data signals having uniform amplitude and duration for the input to said paths.

5. Apparatus as described in claim 1 further including means responsive to said output signal and controlled by a said timing signal for resetting said storage means.

6. Apparatus as described in claim 1 further including means for producing for each said timing signal a counterpart signal with a predetermined delay for controlling said output signal producing means.

7. Apparatus for synchronizing random input data signals of fluid pressure with timing signals of fluid pressure and prescribed frequency comprising:
- means providing a first propagation path for said input data signals;
- means providing a second propagation path for said input data signals, and being arranged to receive said data signals in common with said first path and to produce a predetermined delay in signals propagated therethrough;
- means interconnected between said paths and responsive to said timing signals for directing said data signals along said first path upon detecting the presence of a predetermined degree of coincidence between one of said timing signals and a said data signal, and along said second path upon the absence of said degree of coincidence; and
- means controlled by said timing signals for providing an output signal during the period of said one timing signal when said data signal traverses said first path and during the period of a succeeding timing signal when said data signal traverses said second path.

8. Apparatus as described in claim 7 wherein said directing means includes a plurality of devices having movable, flexible diaphragms controlled by fluid pressure.

9. Fluid-operated apparatus for synchronizing successive random input data signals with regularly recurring timing signals comprising:
- means settable in response to a signal applied thereto to store a data signal therein;

means providing a first propagation path for said data signal to said storage means;

means providing a second propagation path for said data signal to said storage means, said second path being arranged to receive a said data signal in common with said first path and having means to delay the propagation of a signal therein by a predetermined time;

means operable during each timing signal interval for applying each said data signal to said storing means over said first path in response to coincidence and over said second path in response to noncoincidence with a said timing signal; and means controlled by successive ones of said timing signals for producing an output signal representative of a said stored data signal during the period of one of said timing pulses or during the period of a succeeding one of said timing pulses in accordance with the path used.

10. Apparatus as described in claim 9 wherein said storage means comprises a plurality of logical NOR devices interconnected to perform a latching function when actuated by said input data signals.

11. Apparatus as described in claim 10 wherein said NOR devices each comprise a plurality of devices having flexible diaphragms movable in response to fluid pressure.

References Cited

UNITED STATES PATENTS

| | | | |
|---|---|---|---|
| 3,241,758 | 3/1966 | Gobhai | 235—201 |
| 3,350,010 | 10/1967 | Rose | 235—201 |
| 3,366,129 | 1/1968 | Schoppe et al. | 235—201 |

RICHARD B. WILKINSON, Primary Examiner

L. R. FRANKLIN, Assistant Examiner